United States Patent
Klotz

(10) Patent No.: US 9,289,928 B2
(45) Date of Patent: Mar. 22, 2016

(54) METHOD FOR COATING A MOLDED PART

(71) Applicant: KraussMaffei Technologies GmbH, München (DE)

(72) Inventor: Bernd Klotz, Bergkirchen (DE)

(73) Assignee: KRAUSSMAFFEI TECHNOLOGIES GMBH, München (DE)

( * ) Notice: Subject to any disclaimer, the term of this patent is extended or adjusted under 35 U.S.C. 154(b) by 0 days.

(21) Appl. No.: 14/349,930

(22) PCT Filed: Oct. 1, 2012

(86) PCT No.: PCT/EP2012/069327
§ 371 (c)(1),
(2) Date: Apr. 4, 2014

(87) PCT Pub. No.: WO2013/053612
PCT Pub. Date: Apr. 18, 2013

(65) Prior Publication Data
US 2014/0300023 A1 Oct. 9, 2014

(30) Foreign Application Priority Data

Oct. 11, 2011 (DE) .......................... 10 2011 115 591

(51) Int. Cl.
| | |
|---|---|
| B29C 47/76 | (2006.01) |
| B29C 45/14 | (2006.01) |
| B29C 45/76 | (2006.01) |
| B29C 37/00 | (2006.01) |
| B29C 45/16 | (2006.01) |

(52) U.S. Cl.
CPC ............. B29C 45/14 (2013.01); B29C 37/0028 (2013.01); B29C 45/7653 (2013.01); B29C 45/1679 (2013.01); B29C 2037/0035 (2013.01); B29C 2045/1687 (2013.01)

(58) Field of Classification Search
None
See application file for complete search history.

(56) References Cited

U.S. PATENT DOCUMENTS

| 2,485,323 A | * | 10/1949 | Schwartz | ....................... 264/245 |
| 3,380,121 A | * | 4/1968 | Chittenden et al. | ............ 425/528 |
| 3,712,575 A | * | 1/1973 | Bement et al. | ................... 249/91 |

(Continued)

FOREIGN PATENT DOCUMENTS

| DE | 28 11 321 | 9/1979 |
| DE | 102007021679 | 11/2008 |

(Continued)

OTHER PUBLICATIONS

International Search Report issued by the European Patent Office in International Application PCT/EP2012/069327 on Nov. 30, 2012.

*Primary Examiner* — Stella Yi
(74) *Attorney, Agent, or Firm* — Henry M. Feiereisen LLC

(57) ABSTRACT

In a method for coating a molded part (1), in particular a molded part produced by injection molding, the molded part (1) is arranged in a cavity (2) of a molding tool (3), wherein a partial cavity (4) between the molded part (1) and a first molding-tool half (5) of the molding tool (3) remains when a closing force (F) is applied to the molding tool (3) at a first closing-force level. A coating mass (6) is introduced into the partial cavity (4) and the coating mass (6) is cured/cross-linked. The closing force (F) of the molding tool (3) is increased during the curing/cross-linking of the coating mass (6), wherein the increase in the closing force (F) causes a volume reduction of the partial cavity (4) due to elastic deformation of the molding tool (3) and/or elastic deformation of the molded part (1).

20 Claims, 4 Drawing Sheets

(56) References Cited

U.S. PATENT DOCUMENTS

| | | | |
|---|---|---|---|
| 4,610,835 A * | 9/1986 | Ghavamikia | 264/250 |
| 4,668,460 A * | 5/1987 | Ongena | 264/255 |
| 5,174,933 A * | 12/1992 | Toh et al. | 264/40.5 |
| 5,741,446 A * | 4/1998 | Tahara et al. | B29C 45/0005 249/115 |
| 6,558,603 B2 | 5/2003 | Wobbe | |
| 6,596,218 B2 | 7/2003 | Klotz | |
| 7,824,597 B2 | 11/2010 | Klotz | |
| 2001/0010412 A1 | 8/2001 | Klotz | |
| 2001/0048170 A1 | 12/2001 | Wobbe | |
| 2003/0164564 A1 | 9/2003 | Klotz | |
| 2003/0164579 A1 | 9/2003 | Prautzsch et al. | |
| 2003/0214081 A1 * | 11/2003 | Ockers | 264/510 |
| 2004/0217502 A1 | 11/2004 | Klotz | |
| 2006/0151911 A1 * | 7/2006 | Zollner et al. | 264/255 |
| 2007/0063386 A1 | 3/2007 | Seaver | |
| 2009/0085235 A1 | 4/2009 | Buerkle et al. | |
| 2012/0128866 A1 | 5/2012 | Eichlseder et al. | |

FOREIGN PATENT DOCUMENTS

| | | |
|---|---|---|
| DE | 102009022238 | 11/2010 |
| EP | 1 020 589 | 5/2001 |

\* cited by examiner

METHOD FOR COATING A MOLDED PART

CROSS-REFERENCES TO RELATED APPLICATIONS

This application is the U.S. National Stage of International Application No. PCT/EP2012/069327, filed Oct. 1, 2012, which designated the United States and has been published as International Publication No. WO 2013/053612 and which claims the priority of German Patent Application, Serial No. 10 2011 115 591.4, filed Oct. 11, 2011, pursuant to 35 U.S.C. 119(a)-(d).

BACKGROUND OF THE INVENTION

The present invention relates to a method for coating a molded part, in particular a molded part produced by injection molding.

Molded parts, in particular molded parts produced by injection molding, are often provided with a coating, for example in order to protect them from external effects or also owing to visual requirements. A possibility for providing the molded part with a coating consists in firstly producing the molded part without a coating, for example in an injection molding machine, and in subsequently coating the molded part at a separate location. For this, the molded part can be conveyed for example by means of a conveyor belt from the injection molding machine into a lacquering chamber, where it then receives a coating in the form of a lacquer.

However, the problem exists there that during the conveying between injection molding machine and lacquering chamber, dust and other particles can become deposited on the molded part. These particles lead to the subsequently applied coating not adhering on the molded part over the entire surface, which inter glia can lead to the coating being limited in its durability.

For this and other reasons, it is desirable to already provide molded parts with a coating in the injection molding machine itself.

From DE 10 2007 021 679 A1 a method for expansion flooding is known. In this method, firstly a molded part of plastic is produced in an injection molding machine. Subsequently, the molded part is removed by means of a cavity core a distance away from the one molding-tool half, whereby a cavity is produced between the molded part and this molding-tool half, into which cavity then a second component, for example a coating, can be filled.

Whilst the known method for expansion flooding enables a coating of the molded part in the injection molding machine, it would be desirable to simplify the structure of the device provided for the method, because in the known method a separate stamping core is necessary. In addition, in the case of very low-viscosity coatings and lacquers, which in part have a lower viscosity than water, it can occur that a seal can not be ensured between the molded part and an adjacent molding-tool half.

An insufficient seal has, inter alia, a great influence on the quality of the finished product and also on the reject rate of defective products. As the defective products can not be readily recycled, due to the fixed connection between molded part and coating, there is a need for improvement in this respect.

SUMMARY OF THE INVENTION

It is therefore an object of the invention to improve known methods for coating a molded part with regard to its complexity and to simplify the sequence of the method.

It is, in addition, an object of the invention to improve the seal of the cavity which is provided for the coating so that also in the case of very low-viscosity coating resins a high coating quality is achieved with a low reject rate.

These problems are solved by a method having the features of claim 1. Advantageous further developments are the subject matter of the subclaims.

The method according to the invention consists substantially of the following method steps:

Firstly, the molded part which is to be coated is arranged in a cavity of a molding tool, wherein a partial cavity remains between the molded part and a first molding-tool half, when a closing force is applied to the molding tool at a first closing-force level. At this closing-force level, the cavity of the molding tool therefore comprises the volume of the molded part and in addition the volume of the partial cavity. However, the volume of the partial cavity is not constant. It was surprisingly found that the volume of the partial cavity changes as a function of the closing force which is applied to the molding tool. Therefore, the size of the partial cavity in terms of volume can be influenced solely by a change to the closing force.

In a second method step, a coating mass is then introduced into the partial cavity and/or is filled in under pressure. In so doing, the coating mass preferably completely fills the partial cavity.

Subsequently, the coating mass is cross-linked (cured) in a known manner. During the cross-linking, however, the volume of the coating mass decreases due to shrinkage.

According to the invention, during the cross-linking of the coating mass the closing force which is applied to the molding tool is increased, wherein the increase of the closing force, due to elastic deformation of the molding tool and/or elastic deformation of the molded part (1), causes a reduction of the partial cavity in terms of volume.

In contrast to known methods and devices, in the method according to the invention it is not necessary to provide a stamping core or similar, because it was surprisingly found that solely through the elastic deformation of the molding tool and/or of the molded part arranged therein, owing to the increase of the closing force a reduction of the partial cavity in terms of volume is able to be set in a defined manner, which can be utilized in the coating of a molded part, in order to balance out the resin-specific shrinkage during cross-linking.

Therefore, according to the invention, inter alia the volume of the partial cavity is adapted over a defined closing force development to individual characteristics, in particular a volume reduction of the coating resin during the cross-linking.

Advantageously, e.g. therefore the increase of the closing force is selected so that the reduction of the partial cavity is adapted to the shrinkage of the coating mass during the cross-linking.

In an advantageous further development of the method according to the invention, provision is made that air which is present in the partial cavity is at least partially, preferably completely, evacuated before and/or during the introduction of the coating mass. Hereby, inter alia a bubble formation in the coating mass can be prevented, which can occur in the case of a very intensive sealing of the partial cavity, because in such a case also air can no longer escape.

As the shrinkage of the coating mass does not take place abruptly during the cross-linking, provision is made in an advantageous further development of the method according to the invention that also the closing force of the molding tool is increased continuously and up to a second closing force level. The second closing force level is advantageously reached precisely when the coating mass is completely cross-linked and/or is no longer shrinking.

As it can occur that the coating mass indeed is no longer shrinking, but nevertheless is not completely cross-linked, it is advantageous if the closing force of the molding tool, after reaching the second closing force level, is held at the second closing force level for a first time interval. Hereafter, the closing force can be shut down and the molding tool can be opened, whereby a removal of the coated molded part is made possible.

Advantageously, the closing force is increased until the volume of the partial cavity is reduced by 6% to 10%, in particular by 8%. This reduction has proved to be particularly advantageous and practicable for known coating masses.

To control and/or regulate the closing force of the molding tool during the cross-linking of the coating mass, provision is made in an advantageous further development of the method according to the invention, that the volume is determined by means of a travel sensor device, which detects the movement of the first molding-tool half, in particular with respect to the molded part.

In an advantageous further development of the method according to the invention, provision is made that the closing force is increased before the introduction of the coating mass for a second time interval to a third closing force level, and subsequently is set to the first closing force level. Advantageously the third closing force level here lies higher than the first closing force level.

It has been surprisingly found that through the elastic deformation of the molding tool owing to the applied closing force not only the size of the partial cavity in terms of volume can be set. In an advantageous further development of the method according to the invention, provision is therefore additionally made that the partial cavity is sealed by means of a material pressure between the first molding-tool half and the molded part and/or between the first molding-tool half and the second molding-tool half. With an increase of the closing force, the surface pressure therefore increases between the first molding-tool half and the molded part or respectively between the first molding-tool half and the second molding-tool half, so that a seal is also guaranteed in the case of high internal pressure and very low-viscosity coating mass.

The method according to the invention is regarded as particularly advantageous for a coating in the form of a lacquer, in particular of a clear lacquer, a colored lacquer or a resin, for which reason these are used in advantageous further developments of the method according to the invention.

More generally, it can be stated that in advantageous further developments of the method according to the invention a substance with a viscosity (dynamic viscosity at 20° C. and 1 bar) in the range of $0.3$ mPA·s$\leq \eta \leq 2$ mPA·s, in particular in the range of $0.7$ mPA·s$\leq \eta \leq 1.3$ MPA·s is used as coating mass.

For the three closing force levels, the first closing force level, the second closing force level and the third closing force level, in particular the following ranges (in combination or separately) are preferred:
first closing force level: between 25 kN and 300 kN;
second closing force level: between 50 kN and 500 kN;
third closing force level: between 50 kN and 1000 kN.

In order to increase the sealing effect for the partial cavity, provision is made in an advantageous embodiment that the partial cavity is sealed at least in part by penetration at least of one sealing edge into the molded part. Alternatively or additionally, it is advantageous if the partial cavity is sealed at least in part by the penetration at least of one sealing edge into a second molding-tool half. In both cases, it is advantageous if the penetration takes place such that an elastic recovery of the molded part and/or of the second molding-tool half takes place on an opening of the molding tool. In this way, the seal is also ensured for subsequent cycles of the method, because no permanent, plastic deformation takes place. Furthermore, visible and/or tangible unevenness is prevented from remaining in the molded part after the method in the case of a seal between the first molding-tool half and the molded part.

In addition to the above-mentioned sealing edge or alternatively thereto, a sealing surface can be provided on one of the molding-tool halves, so that a material pressure can take place between this sealing surface and both the other molding-tool half and also of the molded part arranged therein. The material pressure can be to such an extent that after the raising of the sealing surface always an elastic recovery of the molded part and of the second molding-tool half takes place.

In a particularly advantageous further development of the method according to the invention, provision is made that the volume reduction of the partial cavity takes place to the extent that the molding tool half during the cross-linking rests at every moment under buildup of pressure on the coating mass. Hereby, it is ensured that the shrinkage of the coating mass is completely balanced out. In addition, it is prevented that the coating mass, owing to the shrinkage, becomes detached from the molding-tool half, which would be disadvantageous for the subsequent surface of the coating and hence that of the coated molded part.

According to the invention, it has also been found that the progress of the cross-linking can be influenced by means of the internal pressure prevailing in the partial cavity. This is therefore realized in an advantageous further development of the method according to the invention wherein in particular by means of the chronological development of the internal pressure the progress of the cross-linking is influenced. In so doing, in particular the reaction speed is influenced.

BRIEF DESCRIPTION OF THE DRAWING

The invention is explained in further detail below with the aid of 9 drawings. There are shown here.

DETAILED DESCRIPTION OF PREFERRED EMBODIMENTS

Figure 1:
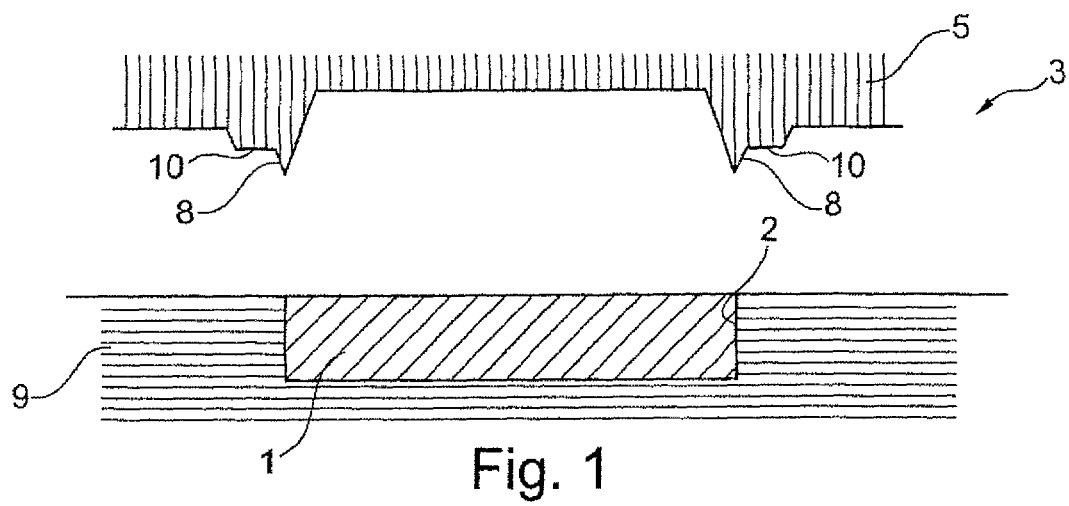
FIGS. 1 to 5: the method sequence according to an embodiment of the method according to the invention with the aid of a molding tool which is illustrated diagrammatically in cross-section.

FIG. 1 shows a molding tool 3, by means of which the method according to the invention is carried out. The molding tool 3 consists of a first molding-tool half 5 and a second molding-tool half 9. In FIG. 1 the molding tool 3 is in an open state. The molding tool 3, more precisely the second molding-tool half 9, has a cavity 2, in which a molded part 1 is arranged, which is coated in the course of the method. The first molding-tool half 5 has two sealing edges 8, by means of which a partial cavity (see FIG. 2) is later sealed.

Figure 2:
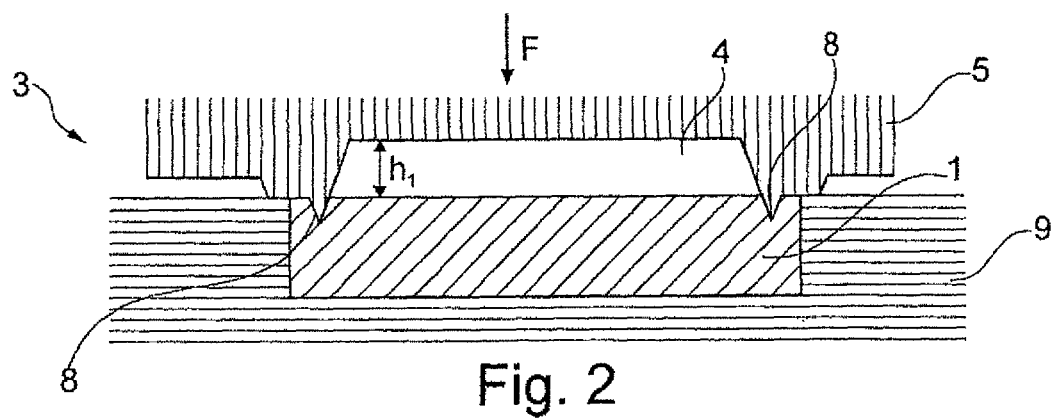

If a closing force F is now applied to the molding tool 3 at a first closing force level, then the molding tool 3 passes into a closed state, as is illustrated in FIG. 2. It can be seen here that the sealing edges 8 penetrate into the molded part 1. However, in so doing, the molded part 1 is merely deformed elastically and not plastically, so that after completion of the method according to the invention no notch remains in the molded part 1. If applicable, a material pressure can also take place between the sealing surface 10 and both of the molded part 1 and also of the second molding-tool half 9. According to the closing force F, an elastic deformation of the molded part 1 and of the second molding-tool half 9 can also occur here in the region of the sealing surface 10.

In FIG. 2 it can be additionally seen that a partial cavity 4 has now been formed between the molded part 1 and the first molding-tool half 3. This partial cavity has a first height $h_1$, which is dependent on the closing force F, because the molding-tool halves 3, 9 also deform elastically on an application with different closing forces F.

Figure 3:
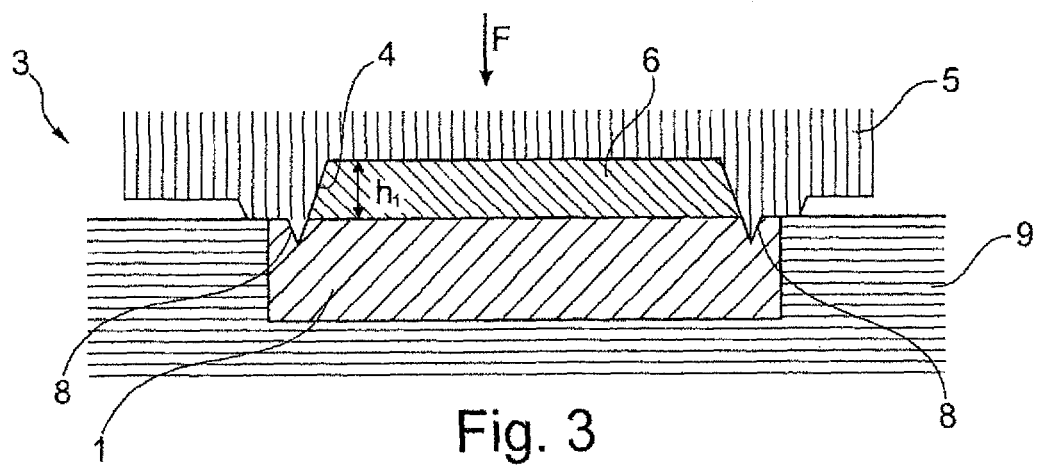

According to the invention, a coating mass 6 is subsequently filled into the partial cavity 4, wherein the partial cavity 4 is completely filled by the coating mass 6. The state after the filling of the coating mass 6 can be seen from FIG. 3. The partial cavity 4 still has the same first height $h_1$.

Figure 4:
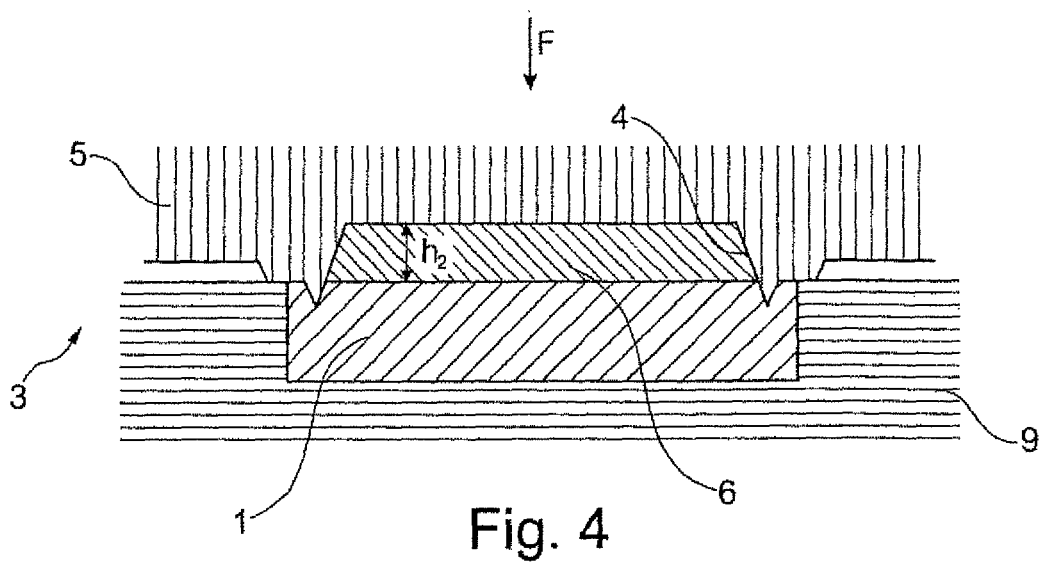

Following thereafter, the cross-linking of the coating mass 6 takes place. This shrinks during the cross-linking. In order to balance out this shrinkage, the closing force F is increased, whereby the partial cavity 4 is reduced in size and the sealing edges 8 penetrate deeper into the molded part 1, wherein the latter is furthermore merely deformed elastically. In this connection, an increasing material pressure can also occur between the sealing surface 10 and both of the molded part 1 and also of the second molding-tool half 9. According to the closing force F, in this connection also a (further) elastic deformation of the molded part 1 and of the second molding-tool half 9 can also occur in the region of the sealing surface 10. After the completion of the cross-linking of the coating mass 6, the partial cavity 4 has a second height $h_2$, which is less than the first height $h_1$ (FIG. 4). However, the coating mass 6 continues to fill the entire volume (which is now less than at the start of the cross-linking) of the partial cavity 4.

Figure 5:
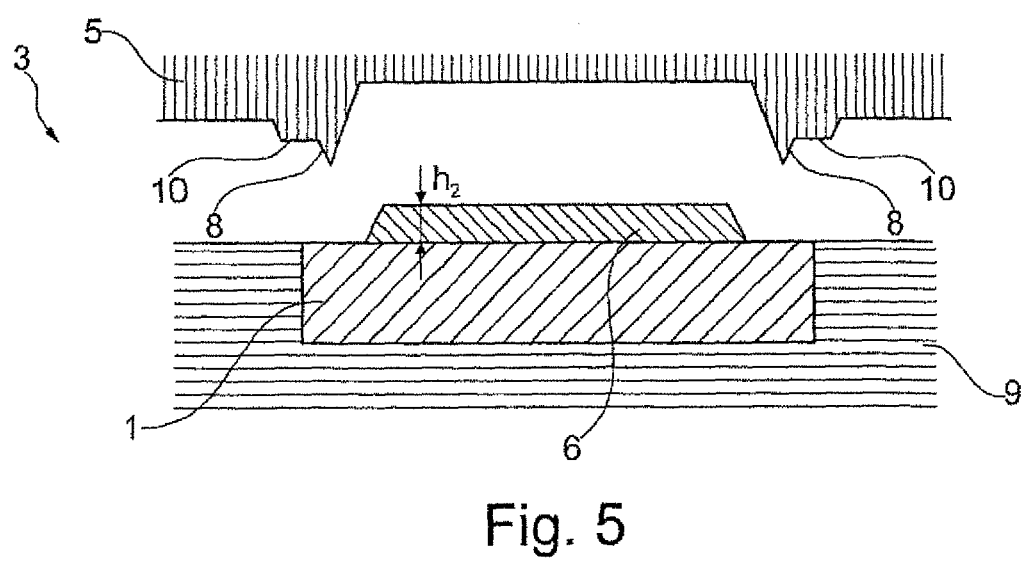

At the end of the method according to the invention, the closing force F is reduced down to 0 and the molding tool 3 is opened, as can be seen from FIG. 5. In this state, it is now possible to remove or eject the coated molded part.

The heights $h_1$ and $h_2$ do not have to be constant over the entire partial cavity 4. Rather, it is made clear that the height of the partial cavity 4 decreases during the method according to the invention, whereby the shrinkage of the coating mass 6 is balanced out.

Figure 6A:
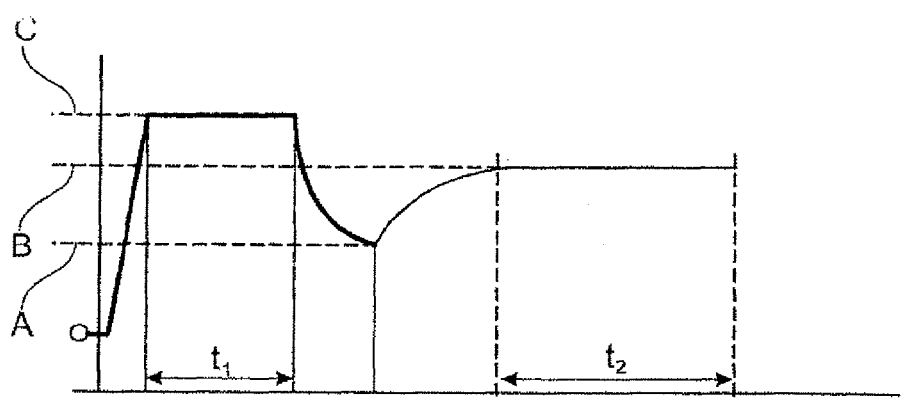
FIGS. 6a to 6d: the developments of the closing force, of the filling pressure, of the tool breathing and of the internal pressure over time during a cycle of the method according to the invention, in an embodiment.

FIG. 6a shows the development of the closing force F of the molding tool 3 over the duration of the method according to the invention. At the start of the method, at a moment α, the closing force F is equal to 0. Then it is increased up to a moment β continuously to a third closing force level C, at which it is held for a first time interval $t_1$, i.e. up to a moment γ. In this period of time, the partial cavity 4 begins to be filled with the coating mass 6. Subsequently, the closing force F is lowered to a first closing force level A, and namely up to a moment δ. The filling of the partial cavity 4 likewise ends at this moment δ.

After the partial cavity 4 is completely filled by the coating mass 6, the cross-linking of the coating mass 6 begins. During the cross-linking, the closing force F is increased from the first closing force level A to a second closing force level B, wherein the second closing force level B in the present example embodiment of the method according to the invention is less than the third closing force level C.

After the closing force F has reached the second closing force level B, it is held for a second time interval $t_2$, i.e. up to a moment ε, at this second closing force level B, in order to ensure that a closing force F is applied to the coating mass 6 at this closing force level B up to complete conclusion of the cross-linking, and is thus held under excess pressure.

Hereby, on the one hand characteristics of the coating, e.g. the surface quality and/or the gloss level are improved, and on the other hand by defined pressure development in the coating layer during the cross-linking, the reproducibility of the results is improved and the reject rate is reduced. The term surface quality or surface grade is understood to mean, within the scope of the invention, in particular the quality of the surface copying or replication. The lacquer is pressed into the steel surface by high internal pressure and therefore a precise copy is produced. More internal pressure through more closing force therefore also produces a better surface quality. Any movement of the lacquer surface forming on the surface can tear the entire layer here, for which reason this is to be avoided according to the invention. The formation of gas in the form of bubbles on the surface of the molded part is suppressed or prevented by the internal pressure or the closing force.

Figure 6B:
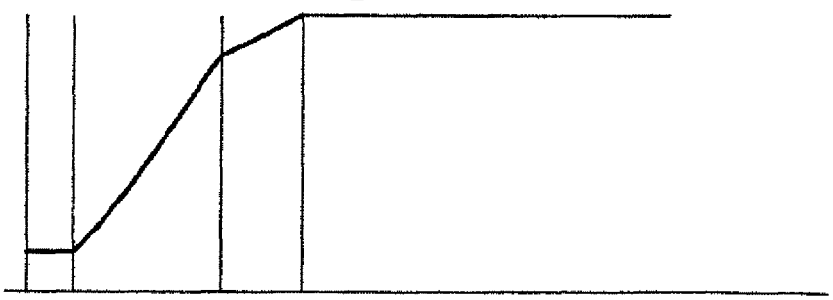

In FIG. 6b the development of the filling pressure, also designated as the injection pressure, is presented over the duration of the method according to the invention. The filling pressure is the pressure with which the coating mass 6 is introduced into the partial cavity 4. At the moment α the filling pressure is equal to 0 and also remains at this level up to the moment β. Subsequently, the filling pressure increases up to the moment δ, wherein the filling pressure between the moment β and the moment γ increases more intensively than between the moment γ and the moment δ. However, in both cases, the rise is linear. Between the moment δ and the moment ε the filling pressure remains at a constant level.

Figure 6C:
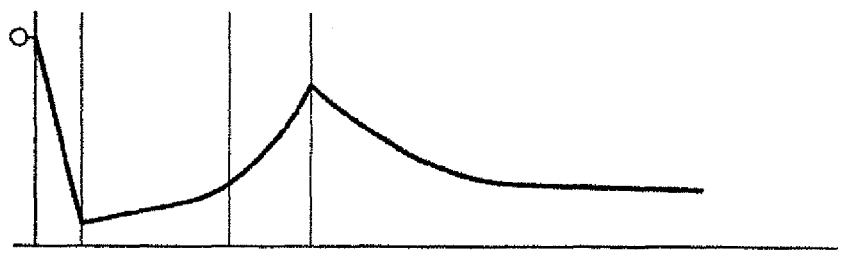
Figure 6D:
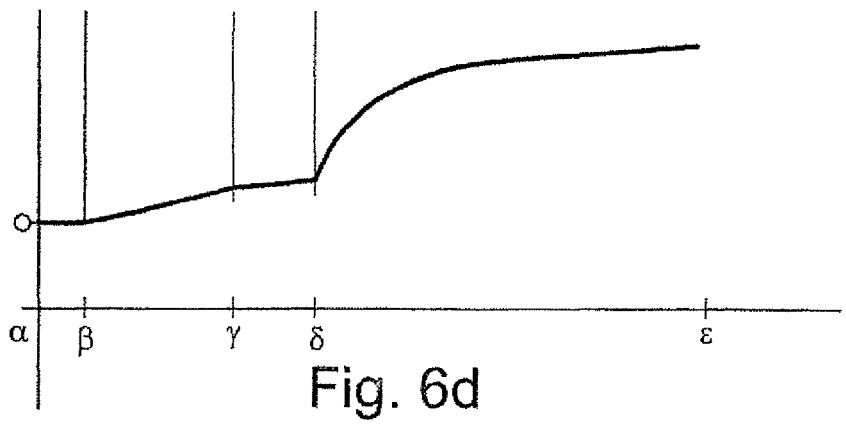

FIG. 6c shows the development of the tool breathing or respectively the compression of the tool over the duration of the method according to the invention. This changes owing to the elastic deformation of the molding tool 3. At the start of the method, at the moment α, the tool breathing is equal to 0, because the molding tool is in fact closed, but is not acted upon by a closing force F. As the closing force F according to FIG. 6a is increased between the moments α and β, the tool breathing falls accordingly up to the moment β. In other words, this means that the molding tool 3 is compressed.

Subsequently, the closing force F in fact remains constant, however the tool breathing increases owing to the increase of the filling pressure (FIG. 6b), because the molding-tool halves 4, 9 of the molding tool 3 are pressed apart by the filling pressure. Up to the moment γ, the tool breathing therefore increases linearly in accordance with the increasing filling pressure.

Because the closing force F is reduced between the moment γ and the moment δ, the tool breathing increases accordingly, wherein in this period of time the filling pressure also increases further, which likewise brings about an increase of the tool breathing. However, the tool breathing remains below the value 0 present at the start time α.

Between the moment δ and the moment ε the tool breathing is reduced again and therefore the compression of the tool is increased, because the closing force F is increased again during the cross-linking of the coating mass 6, and the filling pressure remains constant.

FIG. 6c shows the development of the internal pressure prevailing in the molding tool 3 over the duration of the method according to the invention. This internal pressure is influenced substantially by two components. On the one hand, by the filling pressure of the coating mass 6, and on the other hand by the closing force F of the molding tool 3. The closing force F, however, only has an influence on the internal pressure when the partial cavity 4 is filled with coating mass 6.

Accordingly, the internal pressure at the moment α is equal to 0 (over ambient pressure). The internal pressure also does not change up to the moment β, because the filling pressure does not change. The closing force F in fact rises; because, however, the partial cavity 4 is still empty, i.e. filled with air, this has no substantial influence on the internal pressure.

Between the moment β and the moment δ the internal pressure increases owing to the rise of the filling pressure and the present closing force F. The rise of the internal pressure between the moment δ and the moment ε is brought about solely by the rise of the closing force F, because the filling pressure remains constant in this period of time.

The method according to the invention can be adapted according to the materials which are used and other conditions by means of the development of the closing force and of the filling pressure.

In conclusion, it is to be noted that the developments illustrated in FIGS. 6a to 6d are not to scale and in particular are not presented on a common scale and are merely to be regarded as possible example developments for the purpose of explaining the invention.

Figure 7:
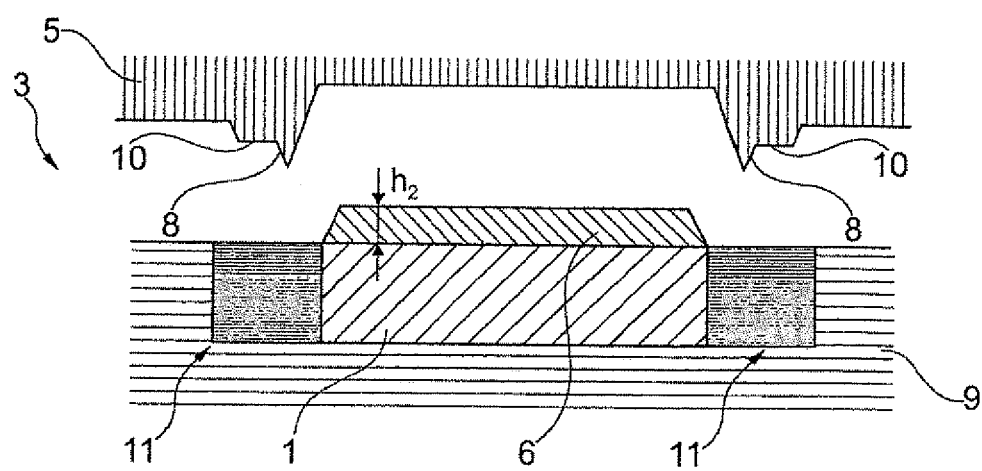
FIG. 7: an alternative embodiment of a molding tool for carrying out the method according to the invention.

FIG. 7 corresponds, with regard to the method sequence, to the situation in FIG. 5 and shows an example embodiment in which the molding-tool half 9 has an insert 11 which is more elastic than the molding-tool halves 5, 9. This insert can therefore have a modulus of elasticity which is less than that of the molding-tool halves 5 and 9, which usually consist of steel. For example, it could be an insert made of bronze or brass. Depending on the processing conditions, however, inserts made of suitable plastic materials can also be used, for example of EPDM. Alternatively to a lower modulus of elasticity or in addition thereto, targeted material weakenings, such as for example suitable indentations, can be provided, which in an analogous manner enable an increased compression or respectively as a result amount to a lower modulus of elasticity. If necessary, the entire molding-tool half 9 can also have a lower modulus of elasticity than the molding-tool half 5 and vice versa. Alternatively to a lower modulus of elasticity or in addition thereto, targeted material weakenings, such as for example suitable indentations, can be provided in one of the molding-tool halves, which in an analogous manner enable an increased compression or respectively as a result amount to a lower modulus of elasticity. In any case, embodiments are also conceivable, in which the use of inserts can be dispensed with. The embodiment of FIG. 7 can be advantageous for methods in which the reduction in size of the partial cavity 4, i.e. the stamping stroke brought about by elastic deformation, assumes relative large values, for example because a particularly large amount of coating mass is used. In the embodiment according to FIG. 7, the sealing edge 8 can be dispensed with if necessary.

The invention claimed is:

1. A method for coating a molded part, comprising the steps of:
providing a molding tool having a first molding-tool half and a second molding-tool half;
arranging the molded part in a cavity of the second molding-tool half, while retaining a cavity of the first molding-tool half empty;
applying a closing force to the molding tool at a first closing-force level so that a partial cavity between the molded part and the first molding-tool half of the molding tool remains;
introducing a coating mass into the partial cavity; and
curing/cross-linking the coating mass while the closing force of the molding tool is increased to thereby cause a volume reduction of the partial cavity as the molding tool and/or the molded part is deformed only elastically.

2. The method of claim 1, further comprising injection-molding the molded part before being arranged in the cavity of the second molding-tool half of the molding tool.

3. The method of claim 1, further comprising adapting the volume reduction to a shrinkage of the coating mass during the cross-linking step.

4. The method of claim 1, further comprising at least partially evacuating air present in the partial cavity before and/or during introduction of the coating mass.

5. The method of claim 1, wherein the closing force of the molding tool is increased continuously up to a second closing-force level during curing of the coating mass.

6. The method of claim 5, wherein the closing force of the molding tool is held for a first time interval at the second closing-force level after the second closing-force level is reached.

7. The method of claim 1, further comprising determining a volume of the partial cavity by a travel sensor device, which detects a movement of the first molding-tool half in a direction of the closing force.

8. The method of claim 6, further comprising increasing the closing force to a third closing-force level before introduction of the coating mass for a second time interval, and subsequently setting the closing force to the first closing-force level.

9. The method of claim 8, wherein the third closing-force level lies higher than the first closing-force level.

10. The method of claim 1, further comprising sealing the partial cavity by material pressure between the first molding-tool half and the molded part and/or between the first molding-tool half and the second molding-tool half.

11. The method of claim 1, wherein the coating mass is a lacquer.

12. The method of claim 1, further comprising sealing the partial cavity at least in part by penetration at least of one sealing edge into the molded part.

13. The method of claim 12, wherein the penetration takes place such that an elastic recovery of the molded part takes place as the molding tool is opened.

14. The method of claim 1, further comprising sealing the partial cavity at least in part by penetration at least of one sealing edge into the second molding-tool half.

15. The method of claim 13, wherein the penetration takes place such that an elastic recovery of the second molding-tool half takes place as the molding tool is opened.

16. The method of claim 1, wherein the partial cavity is reduced in volume such that the molding-tool half rests under buildup of pressure on the coating mass during cross-linking at all times.

17. The method of claim 1, wherein a progress of cross-linking is influenced by a chronological development of an internal pressure prevailing in the partial cavity.

18. The method of claim 1, wherein one of the molding-tool halves has a first modulus of elasticity which differs from a modulus of elasticity of another of the molding-tool halves.

19. The method of claim 1, wherein one of the molding-tool halves has a first modulus of elasticity which differs from a modulus of elasticity of another of the molding-tool halves at least in part in a region of the cavity.

20. The method of claim 1, further comprising providing at least in part at least one insert in one of the first molding-tool half and the second molding-tool half, said insert having a modulus of elasticity which is less than a modulus of elasticity of at least one of the first and second molding-tool halves.

* * * * *